Nov. 11, 1941.                    B. E. SHAW                    2,262,341
           SYSTEM FOR CONTROLLING THE FLOW OF HEATING MEDIUMS
                       Filed May 9, 1938              2 Sheets-Sheet 1
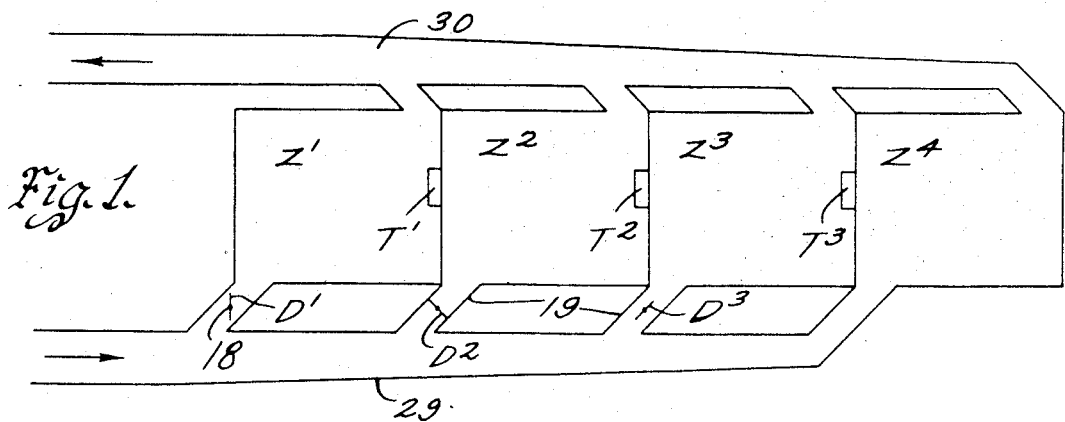
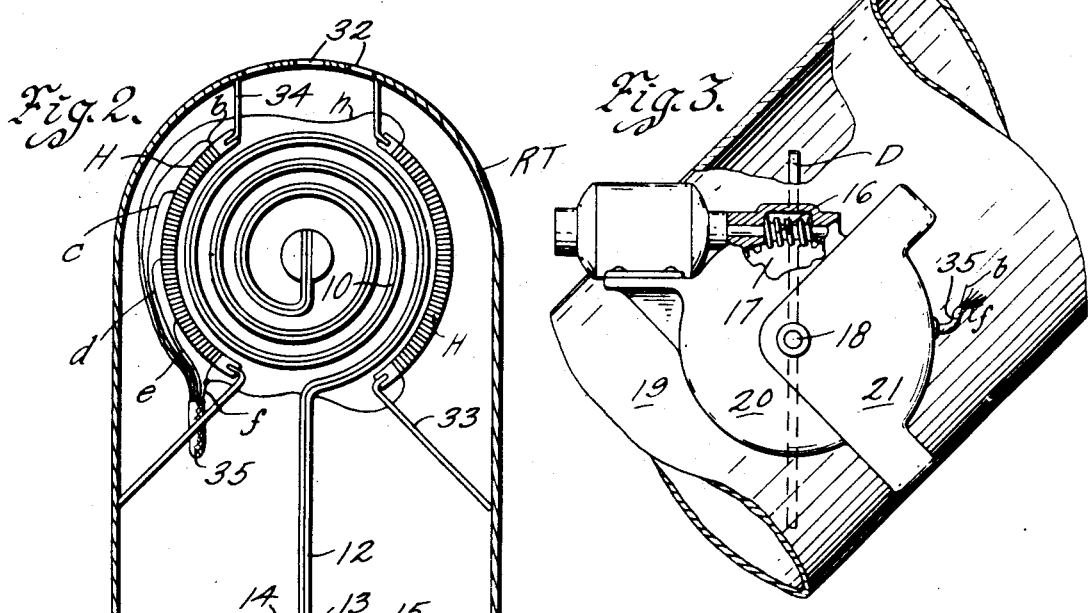

Nov. 11, 1941.　　　　B. E. SHAW　　　　2,262,341
SYSTEM FOR CONTROLLING THE FLOW OF HEATING MEDIUMS
Filed May 9, 1938　　　2 Sheets-Sheet 2
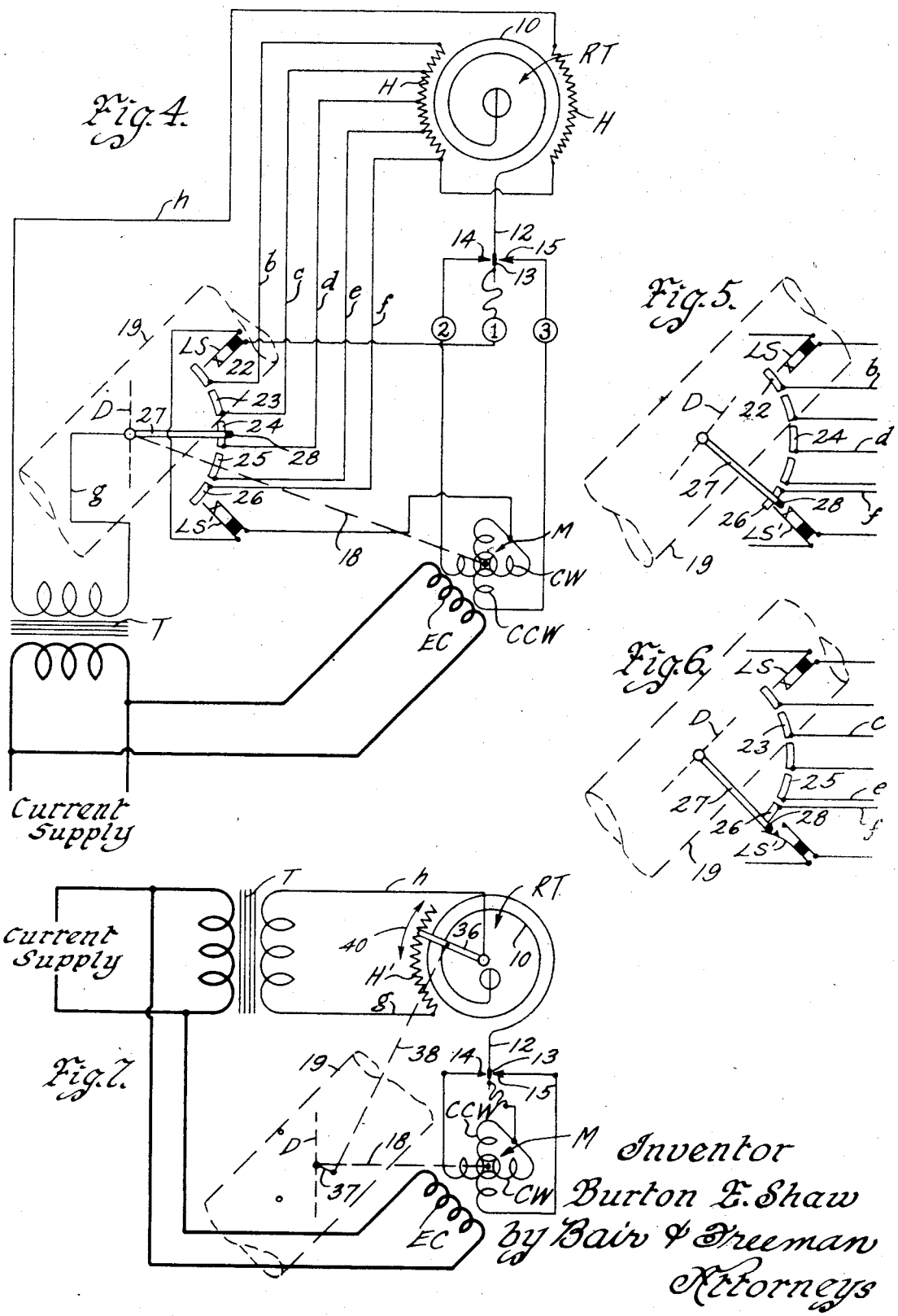

Patented Nov. 11, 1941

2,262,341

UNITED STATES PATENT OFFICE 2,262,341

SYSTEM FOR CONTROLLING THE FLOW OF HEATING MEDIUMS

Burton E. Shaw, Bristol, Ind., assignor to Penn Electric Switch Co., Goshen, Ind., a corporation of Iowa Application May 9, 1938, Serial No. 206,819

2 Claims. (Cl. 236—68)

An object of my present invention is to provide a system including a reversing motor or the like for controlling the flow of a heating or other temperature changing medium in a modulated manner, the system being comparatively simple in construction, arrangement and operation.

A further object of my invention is to provide means for automatically controlling a damper or the like which in turn controls the flow of the temperature changing medium, the damper being controlled by a motor, means for operating the motor and including a thermostat which controls the motor by steps thereby providing a modulating motor system of control.

Another object is to provide means for securing control by steps which consists of having in the thermostat a heating element, the heat from which affects the bimetal element of the thermostat, the degree of such heat being variable and such variation being accomplished by the reversing motor in different positions thereof to thereby supply more or less heat to the bimetal and cause the thermostat to operate in steps as distinguished from gradual movement in either direction as when responsive to changes in ambient temperature only.

Still a further object is to provide a three-wire thermostat connected with a reversing motor for operating a damper or the like and to provide in conjunction with the temperature responsive element of the thermostat, a variable heating means which consists of a resistance, more or less of which is cut into the circuit in response to different positions of the motor.

A further object is to provide a modulating damper control wherein modulation is secured by supplying more or less auxiliary heat to a temperature responsive element so that it tends to open either one side or the other of the thermostat or other control device by anticipating a change in ambient temperature affecting the thermostat and thereby causing the motor to operate in small steps due to opening of the thermostat as a result of change in the heating effect of the auxiliary heating means therein.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a diagrammatic view of a plurality of different zones or rooms to be heated from a common heat source and the supply of heat to each being controlled depending on the temperature therein.

Figure 2 is a front elevation of a thermostat used in my system and showing the front of the casing thereof broken away and the walls of the casing in section.

Figure 3 is a side elevation of a conduit having a motor operated damper therein, the mechanism being designed particularly for use in connection with the thermostat shown in Figure 2.

Figure 4 is an electro-diagrammatic view of my thermostat and motor and showing the motor connected to a damper, the damper being partially open.

Figure 5 is a similar view of the damper showing it almost completely open.

Figure 6 is a similar view showing the damper completely open.

Figure 7 is a diagrammatic view of a modified form of construction; and

Figure 8 shows a further modification of the system for accomplishing the same result.

Heretofore it has been customary to provide modulating motor systems in which mechanical or electrical devices were used for securing operation of a reversing motor or the like for a damper by steps instead of full opening or full closing of the damper. The prime object of my present invention is to provide a system in which the motor may be modulated or controlled by steps depending on supplying auxiliary heat to a room thermostat or the like and increasing or decreasing the degree of such heat by steps depending on rise and fall of the ambient temperature.

Accordingly I have provided a system including a room thermostat RT, a reversing motor M and a damper D controlled thereby (Fig. 4). The room thermostat RT includes a bimetal element 10 responsive to ambient temperature and also to temperature produced by a heating element H. The bimetal element 10 has a switch arm 12 provided with a contact 13 cooperable with opposite contacts 14 and 15. The contact 14 may be called the "cold" contact of the room thermostat and the contact 15 the "hot" contact thereof as a predetermined decrease in temperature affecting the bimetal element 10 closes the contact 13 on the contact 14 while a predetermined increase in temperature causes closure of the contact 13 on the contact 15.

The contacts 13, 14 and 15 are shown connected with terminals 1, 2 and 3 of the thermostat. These in turn are connected in the circuit of the motor M as shown in Figure 4. The terminal 1 is connected through a pair of limit switches LS and LS' to the common terminal of the clockwise and counterclockwise coils CW and CCW of the motor M. The free end of the clockwise coil is connected to the cold contact terminal 2 while the free end of the counter-clockwise coil is connected to the hot contact terminal 3. The limit switches LS and LS' are normally closed and an energizing coil EC of the motor normally energized so that the motor M will rotate clockwise or counter-clockwise depending on whether the room thermostat closes cold or hot.

The motor M is operatively connected as by a worm 16 and a worm gear 17 to a damper shaft 18 (Fig. 3). The damper D is secured to the shaft 18 within a conduit 19. A suitable casing 20, as shown in Figure 3, is provided for the worm and gear 16 and 17. For the limit switches LS and LS' I provide a housing 21. Within the housing 21 there is a plurality of contacts 22, 23, 24, 25 and 26 (Figures 4, 5 and 6). Cooperating with these contacts is a switch blade 27 secured to the damper shaft 18. The switch blade has an insulated end 28 adapted to open the limit switch LS' as shown in Figure 6 when the damper is fully open, and to open the limit switch LS when the damper is fully closed. By this arrangement, the motor M is deenergized whenever the damper is fully opened or fully closed.

The contacts 22, 23, 24, 25 and 26 are connected by wires $b$, $c$, $d$, $e$ and $f$ to the heating element H. The heating element H may be arranged in two parts as shown in Figure 2 to secure maximum effect on the bimetal element 10. For energizing the heating element H, I provide a transformer T having a wire $g$ connected to the switch blade 27 and a wire $h$ connected to the end of the heating element H opposite the wire $b$.

Modulating motors for controlling dampers are used in various installations. By way of illustration I show in Figure 1, four different zones or rooms indicated as $Z^1$, $Z^2$, $Z^3$ and $Z^4$. A conduit 29 supplies either hot or cold air or any desired temperature changing medium to the different zones. Dampers $D^1$, $D^2$ and $D^3$ are located in the branch conductors 19 to individually control the flow of heat or other temperature changing medium to the zones. Each of the zones is provided with its own thermostat such as $T^1$, $T^2$ and $T^3$ for controlling the dampers $D^1$, $D^2$ and $D^3$ independent of each other. A return duct 30 is illustrated and the zone $Z^4$ acts as a "dump chamber" for preventing the heat from being closed against circulation in the duct 29 when all the dampers are closed.

It is obvious that it is desirable to control the dampers so that they assume various balanced positions between wide open and completely closed positions to secure uniform heat for each of the zones. With my described apparatus the operation to secure such modulation of the motor and damper is as follows: Assuming the parts to be in the position shown in Figure 4, if the room thermostat closes cold, the motor will rotate clockwise for moving the damper in an opening direction. As long as the contact 13 remains in engagement with the contact 14 the motor will continue to rotate clockwise. When the switch blade 27 leaves the contact 24 however after contacting with the contact 25, the resistance of the heating element H will be changed and consequently the heat radiated therefrom will be changed. Whereas formerly the circuit was through the wire $d$, it will now be through the wire $e$ so that less of the heating element is in the circuit. Consequently the resistance thereof is less and the amperage flow will be greater, thus causing the heating element to heat further. Such additional heat will act on the bimetal element 10 to cause it to leave the cold contact 14 and thus anticipate a rise in temperature in the room due to the wider opening of the damper D. Accordingly, in the majority of cases the contact 13 will leave the contact 14 soon after the switch blade 27 leaves the contact 24. The contacts 22, 23, 24, 25 and 26 of course are made so that there is no break in the circuit, the blade 27 at times spanning two of the contacts.

If the new position of the damper is insufficient to permit enough heat to flow to the room to satisfy the thermostat and it again closes cold, the clockwise coil of the motor M will be energized for opening the damper still wider as to the position shown in Figure 6. A further call for heat will finally cause the damper to assume a fully open position as shown in Figure 6 whereupon the limit switch LS' is opened to open the circuit of both the clockwise coil and the counter-clockwise coil of the motor.

It will be obvious during the opening of the damper that as the blade 27 engages the contacts 22, 23, 24, 25 and 26 successively, the heat of the heating element H effective on the bimetal element 10 will be changed each time, thus securing the step by step operation desired. Regardless of what position the damper is in (after it has reached at least the position with the blade 27 on the contact 23) any closure of the room thermostat on the hot contact 15 will cause operation of the counter-clockwise coil of the motor for swinging the damper toward closed position.

As soon as the switch blade 27 leaves one contact after engaging the next contact, the heating effect of the heating element H will be reduced because its resistance has been increased and this will tend to open the room thermostat on the hot side. Thus, by increasing the heating effect of the auxiliary heater H by steps as the damper opens and decreasing it by steps as the damper closes, I secure anticipation of the temperature change affecting the room thermostat in either direction. Since the heating value of the heating element is changed in proportion to the movement of the damper, I secure definite steps in which the motor is stopped after the room thermostat closes in either direction. Due to the ambient temperature affecting the thermostat, the damper may stop at various positions in these steps so that actually there are an infinite number of positions in which the damper might stop as compared to a few mechanically definite positions.

The room thermostat RT is preferably designed to secure effective response of the bimetal element 10 to ambient temperature as well as temperature produced by the heating element H. For this purpose the casing of the room thermostat may have air inlet openings 31 (see Figure 2) and air outlet openings 32. Baffles 33 and 34 direct the air so that its flow through the casing will be over the surface of the bimetal element 10 to effect a change in its position as distinguished from dissipating the heat of the heating element H. Other arrangements, of course, can be used to secure substantially the same results.

In an installation of my system, the various wires $b$, $c$, $d$, $e$, $f$ and $h$ may be carried in a small multi-wire cable 35 from the room thermostat to the motor M and the switch mechanism actuated thereby. Since these wires are low voltage, it is unnecessary to provide an expensive cable of high insulating value.

In Figure 7, I have shown, instead of a plurality of wires extending from the room thermostat to the motor, a rheostat consisting of a heating element H', in the room thermostat and having a movable rheostat blade 36. The blade 36 is connected to an arm 37 of the damper D by a link or steel wire 38, encased in a length of tubing. In this manner a mechanical connection is substituted for the electrical connections of Figure 4 and the same results of control of the motor by steps is secured.

In Figure 8 I illustrate a construction in which a motor M' in the room thermostat is energized at the same time the motor M is energized, the two motors being both of reversible construction and of synchronous type. The motor M' (through suitable step down gearing and a shaft 18') actuates a rheostat arm 35' of a heating element H''. Thus the rheostat arm is always synchronized with the damper D which in turn is connected to the motor M.

My arrangement is substantially simple yet secures a modulating action of the motor M without the use of potentiometer circuits, polarized relays and the like. The arrangement of rheostat or switching mechanism synchronized with the damper in its various positions in conjunction with a simple heating element in the room thermostat secures an anticipation of temperature changes which results in a step by step operation of the room thermostat from any position of the damper in either direction depending on whether the temperature rises or falls. The position of the damper in each step is further accurately controlled by the room thermostat itself which will open at a certain position in any given step, depending on what degree the change in ambient temperature has affected the thermostat.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a system for controlling the flow of a heating medium, a conduit for supplying heating medium to a space to be heated, means in said conduit to control the flow of heating medium therethrough, a reversing motor for actuating said means, a thermostat in the space to be heated, a casing therefor, a heating element in said casing for the temperature responsive element of said thermostat means to permit vertical flow of air of the space to be heated through said casing to also affect said temperature responsive element, said thermostat in one position energizing said motor to operate said flow control means toward open position and in an opposite position to operate it toward closed position, an energizing circuit for said heating element, a multiple contact switch, leads for successive contacts of said switch, said leads extending to successive points of said heating element, and a switch arm coacting with said contacts and operatively connected with said flow control means to cut more of said heating element in said casing into the circuit when said means moves in one direction and to cut less of said resistance into the circuit when said flow control means moves in an opposite direction.

2. In a system for controlling the flow of a temperature changing medium, a conduit for supplying temperature changing medium to a space, the temperature of which is to be changed thereby, means in said conduit to control the flow of the medium through said conduit, a reversing motor for actuating said flow control means, a thermostat in said space, a heating element to all of which the temperature responsive element of said thermostat is directly responsive, said thermostat in one position energizing said motor to operate said flow control means toward open position and in an opposite position to operate it toward closed position, means for energizing said heating element, said heating element comprising a variable length resistance element, all of which directly affects the operation of said thermostat when all of said resistance element is energized, and means operable by movement of said flow control means to decrease the length of said resistance element whereby a portion only thereof then directly affects the operation of said thermostat when said flow control means is operated in one direction and to again increase the length thereof when said flow control means is operated in an opposite direction.

BURTON E. SHAW.